(12) United States Patent
Guo et al.

(10) Patent No.: US 7,557,179 B2
(45) Date of Patent: Jul. 7, 2009

(54) POLY(ARYLENE ETHER) FRACTIONATION METHOD

(75) Inventors: Hua Guo, Selkirk, NY (US); Edward N. Peters, Lenox, MA (US)

(73) Assignee: Sabic Innovative Plastics IP B.V. (NL)

( * ) Notice: Subject to any disclaimer, the term of this patent is extended or adjusted under 35 U.S.C. 154(b) by 413 days.

(21) Appl. No.: 11/425,733

(22) Filed: Jun. 22, 2006

(65) Prior Publication Data

US 2007/0299205 A1    Dec. 27, 2007

(51) Int. Cl.
*C08J 3/14* (2006.01)
(52) U.S. Cl. .................. 528/480; 528/491; 528/197
(58) Field of Classification Search ............... None
See application file for complete search history.

(56) References Cited

U.S. PATENT DOCUMENTS 4,673,730 A    6/1987    Siegert et al.

2006/0041086 A1    2/2006    Birsak et al.

OTHER PUBLICATIONS

Abstract for JP 55-120682, Sep. 1980.*
ASTM D 3418-03 (7 pages) "Standard Test Method for Transition Temperatures and Enthalpies of Fusion and Crystallization of Polymers by Differential Scanning Calorimetry".
A. Factor, G.E. Heinsohn, and L.H. Vogt, J. Polym. Sci, Polym. Lett., vol. 7, pp. 205-209, (1969).
E.N. Peters, Chapter 20: Behavior in Solvents, in R.F. Brady, Jr., ed., Comprehensive Desk Reference of Polymer Characterization and Analysis. Oxford University Press: New York, 2003.

* cited by examiner

*Primary Examiner*—Marc S Zimmer
(74) *Attorney, Agent, or Firm*—Cantor Colburn LLP

(57) ABSTRACT

A poly(arylene ether) may be fractionated into higher and lower molecular weight fractions by forming a mixture that includes a poly(arylene ether) starting material, a first solvent that is dichloromethane, bromochloromethane, dibromomethane, or a mixture thereof, and a second solvent different from the first solvent having a Hildebrand solubility parameter of about 16 to about 22 megapascal$^{1/2}$. The mixture separates into fractions containing higher and lower molecular weight poly(arylene ether)s.

28 Claims, No Drawings

POLY(ARYLENE ETHER) FRACTIONATION METHOD

BACKGROUND OF THE INVENTION

Poly(arylene ether)s and their blends with styrenic resins are highly valued for their tailorable combination of stiffness, ductility, heat resistance, and electrical resistance. The oxidative polymerization reactions used to prepare poly(arylene ether)s often produce a broad range of molecular weights. The precipitation methods typically used to isolated the poly (arylene ether)s from the polymerization reaction solution usually have little effect on the molecular weight distribution. Similarly, so-called total isolation procedures, in which a poly(arylene ether) is isolated via removal of all volatile components from a reaction mixture, have little effect on the molecular weight distribution of the poly(arylene ether) product. While it is possible to exert some control over the molecular weight of a poly(arylene ether) by varying the polymerization reaction conditions, it would be useful—both for research and for commercial applications—to have a convenient and economical method of fractionating an existing poly(arylene ether), that is, separating it into different molecular weight fractions. And it would be particularly desirable to have a fractionation method that produces fractions having different molecular weights but similar ratios of weight average molecular weight to number average molecular weight.

BRIEF DESCRIPTION OF THE INVENTION

A poly(arylene ether) may be conveniently fractionated by a method comprising forming a mixture comprising a first poly(arylene ether); a first solvent selected from the group consisting of dichloromethane, bromochloromethane, dibromomethane (having Hildebrand solubility parameters of 19.8, 18.8, and 18.9 megapascal$^{1/2}$, respectively), and mixtures thereof; and a second solvent having a Hildebrand solubility parameter of about 16 to about 22 megapascal$^{1/2}$, with the proviso that the second solvent does not comprise dichloromethane, bromochloromethane, or dibromomethane.

Another embodiment is a method of fractionating a poly (arylene ether), comprising: forming a mixture comprising a first poly(arylene ether), a first solvent, and a second solvent; wherein the first poly(arylene ether) has an intrinsic viscosity of about 0.1 to about 0.3 deciliter per gram in chloroform at 25° C.; wherein the first solvent is dichloromethane; wherein the second solvent is selected from the group consisting of toluene, chloroform, and mixtures thereof, and wherein at least 90 weight percent of the first poly(arylene ether) is initially dissolved in the mixture; separating a soluble fraction and an insoluble fraction from the mixture; and isolating a second poly(arylene ether) from the soluble fraction; wherein the ratio of the intrinsic viscosity of the second poly(arylene ether) to the intrinsic viscosity of the first poly (arylene ether) is about 0.5 to about 0.9.

Another embodiment is a method of fractionating a poly (arylene ether), comprising: forming a mixture comprising a first poly(arylene ether), a first solvent, and a second solvent; wherein the first poly(arylene ether) has an intrinsic viscosity of about 0.1 to about 0.3 deciliter per gram in chloroform at 25° C.; wherein the first solvent is dichloromethane; wherein the second solvent is selected from the group consisting of toluene and chloroform; wherein the first poly(arylene ether) and the second solvent are present in a ratio of about 0.5:1 to about 1:1; and wherein the second solvent and the first solvent are present in a ratio of about 1:20 to about 1:2; separating a soluble fraction and an insoluble fraction from the mixture; and isolating a second poly(arylene ether) from the soluble fraction; wherein the ratio of the intrinsic viscosity of the second poly(arylene ether) to the intrinsic viscosity of the first poly(arylene ether) is about 0.5 to about 0.8.

Other embodiments are described in detail below.

DETAILED DESCRIPTION OF THE INVENTION

The present inventor has discovered that the use of particular solvent mixtures allows a poly(arylene ether) to be dissolved then fractionated into an insoluble poly(arylene ether) having increased molecular weight and a soluble poly (arylene ether) having decreased molecular weight, both relative to the molecular weight of the starting poly(arylene ether). In particular, the solvent mixture comprises a first solvent selected from dichloromethane, bromochloromethane, dibromomethane (having Hildebrand solubility parameters of 19.8, 18.8, and 18.9 megapascal$^{1/2}$, respectively), and mixtures thereof; and a second solvent (other than dichloromethane, bromochloromethane, or dibromomethane) having a Hildebrand solubility parameter of about 16 to about 22 megapascal$^{1/2}$. The solvent mixture allows some or all of the starting poly(arylene ether) to be readily dissolved, thereby forming a solution that spontaneously generates soluble and insoluble poly(arylene ether) fractions having molecular weights different than the starting poly(arylene ether). The term "spontaneously" is used herein to mean occurring without external stimulus; it is not meant to imply anything about the rapidity with which soluble and insoluble fractions are generated. The ability of the method to fractionate a poly(arylene ether) is particularly surprising and unexpected given the present inventor's discovery that the previously reported phenomenon of poly(arylene ether) dissolution in dichloromethane and spontaneous precipitation does not result in molecular weight fractionation.

Thus, one embodiment is a method comprising forming a mixture comprising a first poly(arylene ether); a first solvent selected from the group consisting of dichloromethane, bromochloromethane, dibromomethane (having Hildebrand solubility parameters of 19.8, 18.8, and 18.9 megapascal$^{1/2}$, respectively), and mixtures thereof; and a second solvent having a Hildebrand solubility parameter of about 16 to about 22 megapascal$^{1/2}$, with the proviso that the second solvent does not comprise dichloromethane, bromochloromethane, or dibromomethane. Methods for calculating Hildebrand solubility parameter values are known in the art, and values for various solvents are tabulated in, for example, Edward N. Peters, Chapter 20: Behavior in Solvents, in R. F. Brady, Jr., ed., *Comprehensive Desk Reference of Polymer Characterization and Analysis*. Oxford University Press: New York, 2003. A representative listing of Hildebrand solubility parameter values (that is, δ values), for poly(2,6-dimethyl-1,4-phenylene ether) and various solvents is given in Table 1, below.

TABLE 1

| Material | δ (MPa$^{1/2}$) |
|---|---|
| Poly(2,6-dimethyl-1,4-phenylene ether) | 19.0 |
| Dichloromethane (Methylene chloride) | 19.8 |
| Dibromomethane | 18.9 |
| Bromochloromethane | 18.8 |
| Toluene | 18.2 |
| Benzene | 18.8 |
| Ethylbenzene | 18.0 |
| o-xylene (1,2-dimethylbenzene) | 18.4 |
| m-xylene (1,3-dimethylbenzene) | 18.0 |

TABLE 1-continued

| Material | δ (MPa$^{1/2}$) |
|---|---|
| p-xylene (1,4-dimethylbenzene) | 18.0 |
| mesitylene (1,3,5-trimethylbenzene) | 18.0 |
| styrene (ethenylbenzene) | 19.0 |
| Chloroform | 19.0 |
| Carbon tetrachloride | 17.6 |
| Chlorobenzene | 19.4 |
| Dioxane | 17.6 |
| Methanol | 29.7 |

In general, Hildebrand solubility parameters can be used to predict solubility. Miscibility is usually favored when the solubility parameters of a solvent and a polymer are within 2 or 3 megapascal$^{1/2}$ of each other. Therefore, one would expect to obtain a miscible system when combining a poly(arylene ether) (solubility parameter about 19 megapascal$^{1/2}$), a first solvent selected from the group consisting of dichloromethane, bromochloromethane, dibromomethane, and mixtures thereof (solubility parameter about 18.8 to about 19.8 megapascal$^{1/2}$), and a second solvent having a Hildebrand solubility parameter of about 16 to about 22 megapascal$^{1/2}$. It is therefore surprising and unexpected that one can use such a poly(arylene ether)/solvent system to fractionate the poly(arylene ether), that is to separate the poly(arylene ether) into soluble and insoluble fraction having different molecular weights.

As noted above, fractionation occurs spontaneously once the mixture comprising the first poly(arylene ether), the first solvent, and the second solvent is formed. So, the only action necessary to effect fractionation is to prepare the mixture. Depending on factors including the structure and molecular weight of the first (starting material) poly(arylene ether) and the solvent composition, the insoluble fraction may be amorphous or semicrystalline. For convenience, the insoluble fraction is sometimes referred to as a "precipitate", but such reference does not preclude crystallinity in the insoluble fraction. The method may, optionally, further comprise separating the mixture after fractionation to yield a soluble fraction comprising a second poly(arylene ether) and an insoluble fraction comprising a third poly(arylene ether). Such a separation may be conducted using various methods known in the art, including filtration and liquid-solid centrifugation. The method may also, optionally, further comprise isolating the second poly(arylene ether) from the soluble fraction. Such isolation may be conducted using various methods known in the art, including precipitation with an antisolvent, and devolatilization of solvents and other volatiles by methods including devolatilizing extrusion.

The term "fractionated" means that the second (soluble) poly(arylene ether) and third (insoluble) poly(arylene ether) have different number average molecular weights than the first (starting material) poly(arylene ether). Specifically, the third poly(arylene ether) has an increased number average molecular weight and the second poly(arylene ether) has a decreased number average molecular weight, both relative to the first poly(arylene ether). In some embodiments, the ratio of the number average molecular weight of the second (soluble) poly(arylene ether) to the number average molecular weight of the first (starting material) poly(arylene ether) is about 0.4 to about 0.9. Within this range, the ratio may be at least about 0.5, or at least about 0.6. Also within this range, the ratio may be up to about 0.8, or up to about 0.7.

The extent of fractionation may also be expressed as a ratio of the intrinsic viscosities of the second (soluble) poly (arylene ether) and the first (starting material) poly(arylene ether). Thus, in some embodiments, the ratio of the intrinsic viscosity of the second poly(arylene ether) to the intrinsic viscosity of the first poly(arylene ether) is about 0.5 to about 0.9. Within this range, the ratio may be at least about 0.6. Also within this range, the ratio may be up to about 0.8.

The method is particularly useful for isolating a relatively low molecular weight poly(arylene ether). Thus, in some embodiments, the second (soluble) poly(arylene ether) has a number average molecular weight of about 1,000 to about 10,000 atomic mass units. Within this range, the number average molecular weight may be at least about 1,200 atomic mass units, or at least about 1,400 atomic mass units. Also within this range, the number average molecular weight may be up to about 7,000 atomic mass units, or up to about 4,000 atomic mass units. In some embodiments, the second poly (arylene ether) has an intrinsic viscosity of about 0.02 to about 0.2 deciliter per gram. Within this range, the intrinsic viscosity may be at least about 0.04 deciliter per gram, or at least about 0.06 deciliter per gram. Also within this range, the intrinsic viscosity may be up to about 0.16 deciliter per gram, or up to about 0.12 deciliter per gram. Intrinsic viscosity may be measured at 25° C. in chloroform on samples containing 0.40 grams poly(arylene ether) per 50 milliliters chloroform, where the poly(arylene ether) samples are dried for 1 hour at 125° C. under vacuum before testing.

The mixture containing the first poly(arylene ether), the first solvent, and the second solvent may be prepared using various orders of addition. Thus, in one embodiment, forming a mixture comprises combining the first poly(arylene ether) and the second solvent, and blending the first solvent with the combined first poly(arylene ether) and second solvent. In another embodiment, forming a mixture comprises combining the first poly(arylene ether) and the first solvent, and blending the second solvent with the combined first poly (arylene ether) and first solvent. In another embodiment, forming a mixture comprises blending the first solvent and the second solvent, and blending the first poly(arylene ether) with the combined first solvent and second solvent. In another embodiment, the first poly(arylene ether), the first solvent, and the second solvent are simultaneously blended.

The method is applicable to a wide variety of poly(arylene ether) structures. In some embodiments, the first poly(arylene ether) comprises repeating structural units having the formula

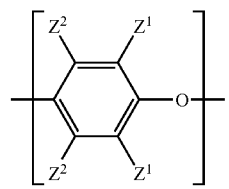

wherein for each structural unit, each $Z^1$ is independently halogen, unsubstituted or substituted $C_1$-$C_{12}$ hydrocarbyl with the proviso that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms; and each $Z^2$ is independently hydrogen, halogen, unsubstituted or substituted $C_1$-$C_{12}$ hydrocarbyl with the proviso that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms. As used herein, the term "hydrocarbyl", whether used by itself, or as a prefix, suffix, or fragment of another term, refers to a residue that contains only carbon and hydrogen. The residue may be aliphatic or aromatic, straight-chain, cyclic, bicyclic, branched, saturated, or unsaturated. It may also contain combinations of aliphatic, aromatic, straight chain, cyclic, bicyclic, branched, saturated, and unsaturated hydrocarbon moieties. However, when the hydrocarbyl residue is described as "substituted", it may contain heteroatoms over and above the carbon and hydrogen members of the substituent residue. Thus, when specifically described as substituted, the hydrocarbyl residue may also contain halogen atoms, nitro groups, cyano groups, carbonyl groups, carboxylic acid groups, ester groups, amino groups, amide groups, sulfonyl groups, sulfoxyl groups, sulfonamide groups, sulfamoyl groups, hydroxyl groups, alkoxyl groups, or the like, and it may contain heteroatoms within the backbone of the hydrocarbyl residue. In some embodiments, the first poly(arylene ether) comprises 2,6-dimethyl-1,4-phenylene ether units, 2,3,6-trimethyl-1,4-phenylene ether units, or a combination thereof.

The first poly(arylene ether) may be a so-called bifunctional or polyfunctional poly(arylene ether). Suitable bifunctional poly(arylene ether)s include those having the structure bon atoms separate the halogen and oxygen atoms; each occurrence of $R^1$ is independently hydrogen or

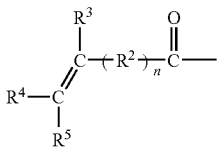

wherein n is 0 or 1; $R^2$ is $C_1$-$C_{12}$ hydrocarbylene; $R^2$ and $R^3$ and $R^4$ are each independently hydrogen or $C_1$-$C_{18}$ hydrocarbyl; and Y has a structure selected from

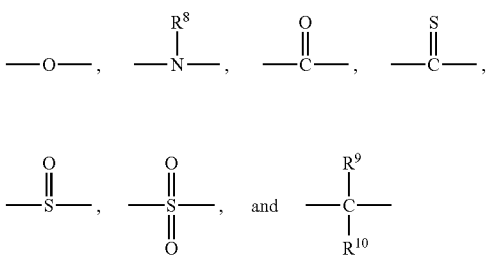

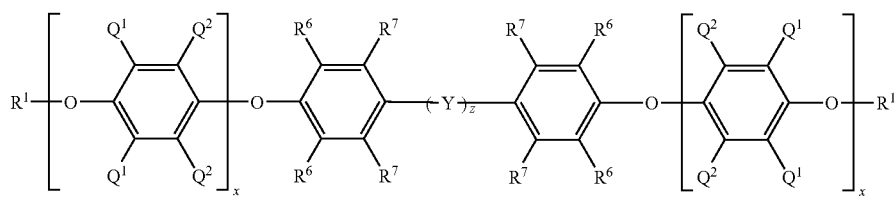

wherein z is 0 or 1; each occurrence of x is independently 1 to about 100, or 1 to about 50; each occurrence of $Q^1$ is independently halogen, unsubstituted or substituted $C_1$-$C_{12}$ hydrocarbyl with the proviso that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms; each occurrence of $Q^2$ and $R^6$ and $R^7$ is independently hydrogen, halogen, unsubstituted or substituted $C_1$-$C_{12}$ hydrocarbyl with the proviso that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carwherein each occurrence of $R^8$, $R^9$, and $R^{10}$ is independently selected from hydrogen and $C_1$-$C_{12}$ hydrocarbyl. In one embodiment, each $Q^1$ and $R^6$ is methyl, each $Q^2$ and $R^7$ is independently hydrogen or methyl, z is 1, Y is isopropylidene, and $R^1$ is (meth)acryloyl (that is, n is zero, each $R^3$ is independently hydrogen or methyl, and $R^4$ and $R^5$ are hydrogen).

In one embodiment, the first poly(arylene ether) is a bifunctional poly(arylene ether) having the structure

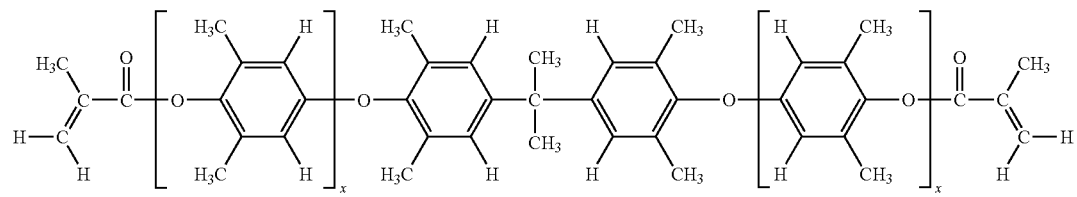

wherein each occurrence of x is independently 1 to about 50.

Various methods of producing bifunctional and polyfunctional poly(arylene ether)s are known. For example, a poly(arylene ether) produced by oxidative polymerization of a monohydric phenol may be "redistributed" by reaction with an oxidizing agent and a dihydric or polyhydric phenol. As another example, a bifunctional or polyfunctional poly(arylene ether) may be produced directly by oxidative polymerization of a mixture of a monohydric phenol, such as 2,6-xylenol, and a dihydric or polyhydric phenol, such as 4,4'-isopropylidene bis(2,6-dimethylphenol). Additional methods of producing poly(arylene ether)s having more than one phenolic hydroxy group per molecule are described in U.S. Patent Application Publication No. US 2006/0041086 A1 of Birsak et al. Bifunctional and polyfunctional poly(arylene ether)s include not only those molecules having 2 and more than 2 phenolic hydroxy groups per molecule, respectively, but also derivatives in which phenolic hydroxy groups have been "capped" via an ester or ether linkage. For example, bifunctional poly(arylene ether)s include the bifunctional, methacrylate-capped poly(arylene ether)s described in U.S. Patent Application Publication No. US 2006-0041086 A1 of Birsak et al.

The method comprises forming a mixture comprising, in addition to the first poly(arylene ether), a first solvent selected from the group consisting of dichloromethane, bromochloromethane, dibromomethane, and mixtures thereof, and a second solvent other than dichloromethane, bromochloromethane, and dibromomethane having a Hildebrand solubility parameter of about 16 to about 22 megapascal$^{1/2}$. On some embodiments, the first solvent is dichloromethane. With the range of about 16 to about 22 megapascal$^{1/2}$, the second solvent may have a Hildebrand solubility parameter value of at least about 17 megapascal$^{1/2}$, or at least about 18 megapascal$^{1/2}$. Also within the above range, the second solvent may have a Hildebrand solubility parameter value of up to about 21 megapascal$^{1/2}$, or up to about 20 megapascal$^{1/2}$.

Suitable second solvents include, for example, aromatic hydrocarbon solvents, halogenated aromatic hydrocarbon solvents, and halogenated alkane solvents. Specific suitable aromatic hydrocarbon solvents include, for example, benzene, toluene, ethylbenzene, xylenes, anisole, and mixtures thereof. In some embodiments, the second solvent is toluene. Specific suitable halogenated aromatic hydrocarbon solvents include, for example, chlorobenzene, dichlorobenzenes, trichlorobenzenes, tetrachlorobenzenes, pentachlorobenzene, hexachlorobenzene, bromobenzene, dibromobenzenes, iodobenzene, diiodobenzenes, and the like, and mixtures thereof. Specific suitable halogenated alkane solvents include, for example, trichloromethane (chloroform), tetrachloromethane (carbon tetrachloride), dichloroethanes, trichloroethanes, tetrachloroethanes, pentachloroethane, hexachloroethane, tribromomethane, dibromoethanes, and mixtures thereof. In some embodiments, the second solvent is chloroform.

The method is most effective when most of the first (starting) poly(arylene ether) is dissolved in the initial solvent mixture. Thus, in some embodiments, forming a mixture comprises dissolving at least 80 weight percent, at least 90 weight percent, at least 95 weight percent, at least 98 weight percent, or at least 99 weight percent of the first poly(arylene ether) in the mixture. In one of these embodiments, the first poly(arylene ether) is completely dissolved. In another of these embodiments, the first poly(arylene ether) is only partially dissolved.

Although the method may be conducted entirely at ambient temperature (for example about 15 to about 30° C.), it is also possible to adjust the temperature of the mixture. For example, the temperature of the mixture may be adjusted (typically, warmed) to facilitate dissolution of the first poly(arylene ether). In such cases, the adjusted temperature may be as low as about 10° C., or 20° C., or 30° C. The adjusted temperature may be as high as the temperature at which the mixture has a vapor pressure of about 100 kilopascals (about one atmosphere). In other words, the temperature may be as high as the atmospheric boiling point of the mixture. Thus, the upper limit of the adjusted temperature will depend on factors including the identity of the first solvent, the identity of the first poly(arylene ether), and the concentration of the first poly(arylene ether) in the mixture.

A wide range of mixture compositions is effective to fractionate the first poly(arylene ether). For example, the mixture may comprise the first poly(arylene ether) and the second solvent in amounts such that the weight ratio of the first poly(arylene ether) to the second solvent is about 0.2:1 to about 1:1. Within this range, the ratio may be at least about 0.5:1. As another example, the mixture may comprise the second solvent and the first solvent in amounts such that the weight ratio of the second solvent to the first solvent is about 1:50 to about 1:1. Within this range, the ratio may be at least about 1:20, or at least about 1:10. Also within this range, the ratio may be up to about 1:2, or up to about 1:4.

One embodiment is a method of fractionating a poly(arylene ether), comprising: forming a mixture comprising a first poly(arylene ether), a first solvent, and a second solvent; wherein the first poly(arylene ether) has an intrinsic viscosity of about 0.1 to about 0.3 deciliter per gram in chloroform at 25° C.; wherein the first solvent is dichloromethane; wherein the second solvent is selected from the group consisting of toluene, chloroform, and mixtures thereof; and wherein at least 90 weight percent of the first poly(arylene ether) is initially dissolved in the mixture; separating a soluble fraction and an insoluble fraction from the mixture; and isolating a second poly(arylene ether) from the soluble fraction; wherein the ratio of the intrinsic viscosity of the second poly(arylene ether) to the intrinsic viscosity of the first poly(arylene ether) is about 0.5 to about 0.9.

One embodiment is a method of fractionating a poly(arylene ether), comprising: forming a mixture comprising a first poly(arylene ether), a first solvent, and a second solvent; wherein the first poly(arylene ether) has an intrinsic viscosity of about 0.1 to about 0.3 deciliter per gram in chloroform at 25° C.; wherein the first solvent is dichloromethane; wherein the second solvent is selected from the group consisting of toluene and chloroform; wherein the first poly(arylene ether) and the second solvent are present in a ratio of about 0.5:1 to about 1:1; and wherein the second solvent and the first solvent are present in a ratio of about 1:20 to about 1:2; separating a soluble fraction and an insoluble fraction from the mixture; and isolating a second poly(arylene ether) from the soluble fraction; wherein the ratio of the intrinsic viscosity of the second poly(arylene ether) to the intrinsic viscosity of the first poly(arylene ether) is about 0.5 to about 0.8.

The invention is further illustrated by the following non-limiting examples.

PREPARATIVE EXAMPLE 1

This example describes the preparation of poly(arylene ether) copolymer from 2,6-dimethyl phenol and 2,2-bis(3,5-dimethyl-4-hydroxyphenyl)propane. The resulting copolymer had an intrinsic viscosity of about 0.12 deciliter per gram, measured at 25° C. in chloroform.

A monomer solution was prepared using 30.39 kilograms of 2,6-xylenol (2,6-dimethylphenol; Chemical Abstracts Registry No. 576-26-1), 0.94 kilogram of 2,2-bis(3,5-dimethyl-4-hydroxyphenyl)propane ("tetramethylbisphenol A" or "TMBPA"; Chemical Abstracts Registry No. 5613-46-7), and 31.33 kilograms of toluene. The monomer solution was prepared by adding toluene and 2,6-xylenol to a drum, heating to 60° C., and then adding TMBPA and stirring until all the TMBPA had dissolved. After the monomer solution was prepared, the reactor was purged with nitrogen and charged with additional toluene (76.09 kg). A portion (3.23 kilograms) of the monomer solution was then added to the reactor, followed by catalyst components 290 grams di-n-butylamine ("DBA"; Chemical Abstracts Registry No. 111-92-2), 1382.5 grams N,N-dimethylbutylamine ("DMBA"; Chemical Abstracts Registry No. 927-62-8), a previously blended "diamine mix" of 57.0 grams N,N'-di-t-butylethylenediamine ("DBEDA"; Chemical Abstracts Registry No. 3529-09-7) and 28.5 grams didecyl dimethyl ammonium chloride ("PTA"; Chemical Abstracts Registry No. 7173-51-5) and toluene, and a previously blended mixture of 17.3 grams cuprous oxide ("Cu$_2$O"; Chemical Abstracts Registry No. 1317-39-1) and 218.6 grams aqueous hydrogen bromide ("HBr"; Chemical Abstracts Registry No. 10035-10-6). At reaction time zero, the oxygen flow rate was initiated and ramped up to 2.01 standard cubic meters per hour (SCMH) in 0.28 SCMH increments, making sure that the headspace oxygen concentration never exceeded 13%. Starting at reaction time zero, the remaining monomer mixture was added at a rate of 0.80 kilogram/minute over approximately 75 minutes. An additional 18 kilograms of toluene was used to flush the monomer addition system. After 65 minutes, the reaction mixture was heated to maintain a temperature of 49° C. until the end of the run at 110 minutes. The reaction temperature was increased to 60° C., and the reaction mixture was pumped to a different tank for copper removal and thermal equilibration. A solution of 1.54 kilograms trisodium nitrilotriacetate acid ("Na$_3$NTA"; Chemical Abstracts Registry No. 5064-31-3) in 11.4 liters water was prepared and added with agitation to the reaction mixture, the temperature of which had been increased to 74° C. The batch was circulated and agitated for one hour. The two phases were allowed to separate overnight. The next day the aqueous phase was decanted. The light (organic, poly(arylene ether)-containing) phase was transferred to a drum. The poly(arylene ether) copolymer was isolated by a total isolation procedure that consisted of solvent evaporation on a rotary evaporator and oven drying.

Analysis of the dried polymer appears in Table 2.

Intrinsic viscosity was measured in chloroform at 25° C. at 25° C. in chloroform on poly(arylene ether) samples that had been dried for 1 hour at 125° C. under vacuum. The viscometry sample concentration was 0.40 grams per 50 milliliters chloroform.

The molecular weight distribution was determined by gel permeation chromatography (GPC). The chromatographic system consisted of an Agilent Series 1100 system, including isocratic pump, autosampler, thermostatted column compartment, and multi-wavelength detector. The elution solvent was chloroform with 50 parts per million by weight of di-n-butylamine. Sample solutions were prepared by dissolving 0.01 gram of sample in 20 milliliters chloroform with toluene (0.25 milliliter per liter) as an internal marker. The sample solutions were filtered through a Gelman 0.45 micrometer syringe filter before GPC analysis; no additional sample preparation was performed. The injection volume was 50 microliters and the eluent flow rate was set at 1 milliliter/minute. Two Polymer Laboratories GPC columns (Phenogel 5 micron linear (2), 300×7.80 millimeters) connected in series were used for separation of the sample. The detection wavelength was set at 280 nanometers. The data were acquired and processed using an Agilent ChemStation with integrated GPC data analysis software. The molecular weight distribution results were calibrated with polystyrene standards. The results are reported without any correction as "$M_n$ (AMU)" and "$M_w$ (AMU)".

The hydroxyl (OH) group concentration of each poly (arylene ether) was determined by Fourier transform infrared spectroscopy (FTIR) based on the intensity of the OH absorption at 3610 centimeters$^{-1}$. A standard curve of absorption versus concentration derived from a series of 2,6-dimethylphenol standard solutions was used to convert intensities to concentrations.

The method was run on a Fourier transform infrared spectrometer that can measure molecular absorption between 3500 and 3700 centimeters$^{-1}$ (cm$^{-1}$) and can accommodate liquid samples. The values reported were determined on a Nicolet Protégé 460 with OMNIC software. A matched pair of 10-millimeter path length quartz cells (Wilmad Glass, Part No. WG-32-I-10) was used. The chemicals used were 2,6-dimethylphenol (99.5% purity; Aldrich, Part No. D174904-5G) and carbon disulfide (99.9+% purity, HPLC grade, Aldrich, Part No. 27066-0).

Calibration standards were prepared by weighing out samples of 2,6-dimethylphenol in amounts of 10, 20, 30, and 40 milligrams and placing the material in 50 milliliters of carbon disulfide. The absorption of the peaks at 3610 cm$^{-1}$ of the 2,6-dimethylphenol/carbon disulfide standards was measured and a calibration curve was obtained by plotting the absorption at 3610 cm$^{-1}$ versus OH end-group concentration in the 2,6-dimethylphenol/carbon disulfide standards.

The poly(arylene ether) samples were prepared by weighing 0.30 grams of poly(arylene ether) powder and dissolving it in 25 milliliters of carbon disulfide. The absorption at 3610 cm$^{-1}$ of the PPE-carbon disulfide solution was measured.

The concentration of 2,6-dimethylphenol in the standard solutions, in micromoles per 50 milliliters (µmol/50 mL), is calculated using the following equation:

$$\mu mol\_2,6\text{-dimethylphenol}/50 \text{ mL} = \frac{(\text{weight\_of\_2,6-dimethylphenol\_mg})}{(122.17)(1000)}$$

wherein "µmol_2,6-dimethylphenol/50 mL" is the concentration of 2,6-dimethylphenol in micromoles per 50 milliliters, and "weight_of_2,6-dimethylphenol_mg" is the weight of 2,6-dimethylphenol in milligrams.

The weight percent OH is calculated using the following equation:

$$\text{wt. \% OH} = \frac{(IRabsorption - \text{intercept})}{(\text{slope} \times PPE\_g \times 2)(0.0017)}$$

wherein "wt. % OH" is the weight percent of hydroxyl groups based on the total weight of the poly(arylene ether), "IRabsorption" is the hydroxy-related absorption of the sample, "intercept" is the intercept of a calibration plot of IR absorption versus 2,6-dimethylphenol concentration, "slope" is the slope of a calibration plot of IR absorption versus 2,6-dimethylphenol concentration, and "PPE_g" is weight of the poly(arylene ether) sample, in grams.

The hydroxyl group concentration in parts per million by weight (ppm) is calculated by using the following equation:

ppm OH=(µmol OH/PPE_g)×17 wherein "ppm OH" is the parts per million by weight of hydroxy (OH) groups based on the total weight of the poly (arylene ether), "µmol OH" is the micromoles of OH in the poly(arylene ether) sample, "PPE_g" is the weight of the poly(arylene ether) sample, in grams, and 17 is the molecular weight of a hydroxy group, in grams per mole.

TABLE 2

| Analysis | Value |
|---|---|
| Intrinsic Viscosity, dl/g | 0.119 |
| OH end group, ppm | 9618 |
| $M_w$ (AMU) | 4322 |
| $M_n$ (AMU) | 2340 |
| $M_w/M_n$ | 1.85 |

Comparative Example 1

These examples illustrate that dissolving a poly(arylene ether) in methylene chloride alone does not result in significant molecular weight fractionation of the poly(arylene ether), even though soluble and insoluble poly(arylene ether)s are formed.

The poly(arylene ether) starting material was a poly(2,6-dimethyl-1,4-phenylene ether) having an intrinsic viscosity of 0.12 deciliter per gram in chloroform at 25° C., a weight average molecular weight of 4,382 atomic mass units, a number average molecular weight of 2,344 atomic mass units, and a hydroxyl (—OH) group content of 9,056 parts per million by weight. Dichloromethane was obtained as stabilized methylene chloride from Fisher Scientific International, Inc. and used as received. In a one-liter container, fifty grams of this poly(arylene ether) were dissolved with stirring in 350 grams of room temperature methylene chloride. After the poly (arylene ether) dissolved, the mixture was covered and left under ambient conditions overnight (approximately 16-20 hours), after which some of the poly(arylene ether) had precipitated out of solution. The precipitate was isolated by filtration, dried at 100° C. and 28 millimeters of mercury vacuum for 16 hours, weighed, and analyzed. The poly (arylene ether) that remained in solution was isolated by removing the toluene and methylene chloride using a rotary evaporator. The solid was weighed and analyzed.

Intrinsic viscosities, molecular weight properties, and hydroxyl group concentrations were determined as described above. The results, presented in Table 3, show that there is very little difference in the properties of the soluble and insoluble poly(arylene ether) samples. The ratio of the number average molecular weight of the soluble poly(arylene ether) to the number average molecular weight of the starting material poly(arylene ether) was 2472/2344 or 1.05. The ratio of the intrinsic viscosity of the soluble poly(arylene ether) to the intrinsic viscosity of the starting material poly(arylene ether) was 1.81/1.87 or 0.97. So, dissolving the poly(arylene ether) in methylene chloride alone was ineffective to separate the sample into fractions having different molecular weights. In other words, methylene chloride alone is ineffective to fractionate the poly(arylene ether).

TABLE 3

| | C. Ex. 1 PPE starting material | C. Ex. 1 insoluble PPE | C. Ex. 1 soluble PPE |
|---|---|---|---|
| PPE amount (g) | 50.00 | 43.73 | 4.76 |
| OH, ppm | 9056 | 9330 | 8918 |
| $M_n$ (AMU) | 2344 | 2263 | 2472 |
| $M_w$ (AMU) | 4382 | 4185 | 4483 |
| $M_w/M_n$ | 1.87 | 1.85 | 1.81 |
| IV (dL/g) | 0.121 | 0.118 | 0.124 |

EXAMPLES 1-3

Comparative Example 2

These examples illustrate the preparation and analysis of products obtained from fractionation of poly(arylene ether) from a solution comprising toluene and dichloromethane. In this procedure, the poly(arylene ether) is first dissolved in toluene, then dichloromethane is added.

The poly(arylene ether) starting material was a poly(2,6-dimethyl-1,4-phenylene ether) having an intrinsic viscosity of 0.12 deciliter per gram in chloroform at 25° C., a weight average molecular weight of 4,889 atomic mass units, a number average molecular weight of 2,254 atomic mass units, and a hydroxyl group content of 6029 parts per million by weight. Toluene was obtained as reagent grade toluene from Fisher Scientific International Inc. and used as received. Dichloromethane was obtained as stabilized methylene chloride from Fisher Scientific International, Inc. and used as received.

Comparative Example 1 corresponds to the poly(arylene ether) starting material. For Examples 1-3, the poly(arylene ether) was dissolved in toluene in a one-liter container. Warming to 50° C. facilitated dissolution. The dichloromethane (methylene chloride) was added with mixing. After mixing for 10 minutes, the mixture was covered and left under ambient conditions overnight (about 16-20 hours at about 23° C.). After that time, some of the poly(arylene ether) had precipitated out of solution. The precipitate was isolated by filtration, dried at 100° C. and 28 millimeters of mercury vacuum for 16 hours, and weighed. The poly(arylene ether) that remained in solution was isolated by removing the toluene and dichloromethane using a rotary evaporator. The solution compositions and amounts of poly(arylene ether) precipitated and remaining in solution are summarized in Table 4.

Weight average molecular weight, number average molecular weight, intrinsic viscosity, and hydroxyl group concentration were determined as described above. Glass transition temperatures ($T_g$) were determined by differential scanning calorimetry (DSC) according to ASTM D 3418.

Property values are presented in Table 5. The results show that using methylene chloride in combination with another solvent that has a solubility parameter similar to that of the poly(arylene ether) provides a means of isolating a lower molecular weight fraction from a poly(arylene ether) starting material while maintaining a very similar polydispersity index. Specifically, the ratios of soluble poly(arylene ether) number average molecular weight to starting material poly (arylene ether) number average molecular weight are 1642/2254 or 0.73 for Example 1, 1776/2254 or 0.79 for Example 2, 1490/2254 or 0.66 for Example 3. And the ratios of soluble poly(arylene ether) intrinsic viscosity to starting material poly(arylene ether) intrinsic viscosity are 0.090/0.120 or 0.75 for Example 1, 0.100/0.120 or 0.83 for Example 2, and 0.08/0.12 or 0.67 for Example 3.

TABLE 4

| | Ex. 1 | Ex. 2 | Ex. 3 |
|---|---|---|---|
| PPE (g) | 50 | 50 | 50 |
| Toluene (g) | 50 | 50 | 60 |
| Methylene chloride (g) | 200 | 300 | 250 |
| Precipitated PPE (g) | 33.7 | 20.0 | 35.9 |
| PPE from solution (g) | 13.4 | 28.4 | 12.9 |

TABLE 5

|  | C. Ex. 2 | Ex. 1 pptd. PPE | Ex. 1 PPE from solution | Ex. 2 pptd. PPE | Ex. 2 PPE from solution | Ex. 3 pptd. PPE | Ex. 3 PPE from solution |
|---|---|---|---|---|---|---|---|
| $T_g$ (° C.) | 166 | 181 | 122 | 168 | 142 | 180 | 120 |
| OH (ppm) | 6029 | 5036 | 6854 | 4754 | 6766 | 4922 | 7077 |
| $M_n$ (AMU) | 2254 | 2431 | 1642 | 2968 | 1776 | 2658 | 1490 |
| $M_w$ (AMU) | 4889 | 5299 | 3580 | 5979 | 4004 | 5462 | 3091 |
| $M_w/M_n$ | 2.17 | 2.18 | 2.18 | 2.01 | 2.25 | 2.05 | 2.07 |
| IV (dL/g) | 0.120 | 0.128 | 0.090 | 0.135 | 0.100 | 0.130 | 0.080 |

EXAMPLES 4-6

The general procedure of Examples 1-3 was used, except that chloroform was substituted for toluene. The poly(arylene ether) starting material was the same as that described above for Comparative Example 2. Compositions are presented in Table 6, and properties in Table 7. The results show that using methylene chloride in combination with another solvent that has a solubility parameter similar to that of the poly(arylene ether) provides a means of isolating a lower molecular weight fraction from a poly(arylene ether) starting material while maintaining a very similar polydispersity index. Specifically, the ratio of the number average molecular weight of the soluble poly(arylene ether) to the number average molecular weight of the starting material poly(arylene ether) is 1886/2254 or 0.84 for Example 4, 1838/2254 or 0.82 for Example 5, and 1790/2254 or 0.79 for Example 6. And the ratio of the intrinsic viscosity of the soluble poly(arylene ether) to the intrinsic viscosity of the starting material poly(arylene ether) is 0.110/0.120 or 0.92 for Example 4, 0.105/0.120 or 0.88 for Example 5, and 0.094/0.120 or 0.78 for Example 6.

TABLE 6

|  | Ex. 4 | Ex. 5 | Ex. 6 |
|---|---|---|---|
| PPE (g) | 50 | 50 | 50 |
| Chloroform (g) | 50 | 50 | 60 |
| Methylene chloride (g) | 400 | 350 | 300 |
| Precipitated PPE (g) | 18.42 | 27.73 | 32.31 |
| PPE from solution (g) | 28.85 | 20.72 | 16.15 |

EXAMPLES 7 and 8

These examples further illustrate the preparation and analysis of products obtained from fractionation of poly (arylene ether) from a solution comprising dichloromethane and another solvent. In these examples, the poly(arylene ether) is dissolved in a mixture of the two solvents.

The poly(arylene ether) starting material was the same as that used for Comparative Example 1, above. In Examples 7 and 8 the poly(arylene ether) was dissolved in a mixture of chloroform and methylene chloride and a mixture of toluene and methylene chloride, respectively. In a one-liter container the poly(arylene ether) was dissolved in the mixed solvent at ambient temperature. After the poly(arylene ether) dissolved, the mixture was covered and left under ambient conditions overnight (approximately 16-20 hours), after which some of the poly(arylene ether) had precipitated out of solution. The precipitate was isolated by filtration, dried, weighed and analyzed. The poly(arylene ether) that remained in solution was isolated by removing the toluene and methylene chloride using a rotary evaporator. The solid was weighed and analyzed.

Fractionation compositions are presented in Table 8, and poly(arylene ether) properties are presented in Table 9.

TABLE 8

|  | Example 7 | Example 8 |
|---|---|---|
| 0.12 IV PPE (g) | 50 | 50 |
| Toluene (g) | none | 50 |
| Chloroform (g) | 50 | none |
| Methylene chloride (g) | 350 | 300 |
| Precipitated PPE (g) | 35.62 | 30.44 |
| PPE from solution (g) | 11.63 | 15.16 |

TABLE 7

|  | C. Ex. 1 | Ex. 4 pptd. PPE | Ex. 4 PPE from solution | Ex. 5 pptd. PPE | Ex. 5 PPE from solution | Ex. 6 pptd. PPE | Ex. 6 PPE from solution |
|---|---|---|---|---|---|---|---|
| $T_g$ (° C.) | 166 | 171 | 145 | 175 | 137 | 179 | 125 |
| OH (ppm) | 6029 | 4632 | 6891 | 4844 | 7024 | 4978 | 7192 |
| $M_n$ (AMU) | 2254 | 3176 | 1886 | 2869 | 1838 | 2568 | 1790 |
| $M_w$ (AMU) | 4889 | 6299 | 4123 | 5859 | 3943 | 5474 | 3796 |
| $M_w/M_n$ | 2.17 | 1.98 | 2.19 | 2.04 | 2.15 | 2.13 | 2.12 |
| IV (dL/g) | 0.120 | 0.142 | 0.110 | 0.135 | 0.105 | 0.131 | 0.094 |

TABLE 9

|  | C. Ex. 1 | Ex. 7 PPE from solution | Ex. 7 pptd. PPE | Ex. 8 PPE from solution | Ex. 8 pptd. PPE |
|---|---|---|---|---|---|
| OH, ppm | 9056 | 13081 | 7688 | 11550 | 7213 |
| $M_n$ | 2344 | 1476 | 2771 | 1647 | 2871 |
| $M_w$ | 4382 | 2303 | 4966 | 2707 | 5149 |
| $M_w/M_n$ | 1.87 | 1.56 | 1.79 | 1.64 | 1.79 |
| IV (dL/g) | 0.121 | 0.077 | 0.133 | 0.091 | 0.132 |

The results for Examples 7 and 8 show that using a mixture of methylene chloride and another solvent having solubility parameter similar to that of the poly(arylene ether) provides a means of fractionating a poly(arylene ether) starting material into lower and higher molecular weight fractions while maintaining a very similar polydispersity index. Specifically, the ratio of the number average molecular weight of the soluble poly(arylene ether) to the number average molecular weight of the starting material poly(arylene ether) was 1476/2344 or 0.63 for Example 7, and 1647/2344 or 0.70 for Example 8. And the ratio of the intrinsic viscosity of the soluble poly (arylene ether) to the intrinsic viscosity of the starting material poly(arylene ether) was 0.077/0.121 or 0.64 for Example 7, and 0.091/0.121 or 0.75 for Example 8. The results also show that the fractionation procedure can be simplified by combining the two solvents before dissolving the poly (arylene ether).

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

All cited patents, patent applications, and other references are incorporated herein by reference in their entirety. However, if a term in the present application contradicts or conflicts with a term in the incorporated reference, the term from the present application takes precedence over the conflicting term from the incorporated reference.

All ranges disclosed herein are inclusive of the endpoints, and the endpoints are independently combinable with each other.

The use of the terms "a" and "an" and "the" and similar referents in the context of describing the invention (especially in the context of the following claims) are to be construed to cover both the singular and the plural, unless otherwise indicated herein or clearly contradicted by context. Further, it should further be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

The invention claimed is:

1. A method of fractionating a poly(arylene ether), comprising:
    forming a mixture comprising
        a first poly(arylene ether),
        a first solvent selected from the group consisting of dichloromethane, bromochloromethane, dibromomethane, and mixtures thereof, and
        a second solvent having a Hildebrand solubility parameter of about 16 to about 22 megapascal$^{1/2}$, with the proviso that the second solvent does not comprise dichloromethane, bromochloromethane, or dibromomethane; and
    separating the mixture to yield a soluble fraction comprising a second poly(arylene ether) and an insoluble fraction comprising a third poly(arylene ether).

2. The method of claim 1, further comprising isolating the second poly(arylene ether) from the soluble fraction.

3. The method of claim 1, wherein the ratio of the number average molecular weight of the second poly(arylene ether) to the number average molecular weight of the first poly(arylene ether) is about 0.4 to about 0.9.

4. The method of claim 1, wherein the second poly(arylene ether) has a number average molecular weight of about 1,000 to about 10,000 atomic mass units.

5. The method of claim 1, wherein the ratio of the intrinsic viscosity of the second poly(arylene ether) to the intrinsic viscosity of the first poly(arylene ether) is about 0.5 to about 0.9.

6. The method of claim 1, wherein the second poly(arylene ether) has an intrinsic viscosity of about 0.02 to about 0.2 deciliter per gram.

7. The method of claim 1, wherein said forming a mixture comprises combining the first poly(arylene ether) and the second solvent, and blending the first solvent with the combined first poly(arylene ether) and second solvent.

8. The method of claim 1, wherein said forming a mixture comprises combining the first poly(arylene ether) and the first solvent, and blending the second solvent with the combined first poly(arylene ether) and first solvent.

9. The method of claim 1, wherein said forming a mixture comprises blending the first solvent and the second solvent, and blending the first poly(arylene ether) with the combined first solvent and second solvent.

10. The method of claim 1, wherein the first poly(arylene ether) comprises repeating structural units having the formula

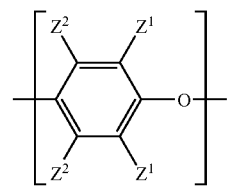

wherein for each structural unit, each $Z^1$ is independently halogen, unsubstituted or substituted $C_1$-$C_{12}$ hydrocarbyl with the proviso that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms; and each $Z^2$ is independently hydrogen, halogen, unsubstituted or substituted $C_1$-$C_{12}$ hydrocarbyl with the proviso that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms.

11. The method of claim 1, wherein the first poly(arylene ether) comprises 2,6-dimethyl-1,4-phenylene ether units, 2,3,6-trimethyl-1,4-phenylene ether units, or a combination thereof.

12. The method of claim 1, wherein the first poly(arylene ether) is a bifunctional poly(arylene ether) having the structure

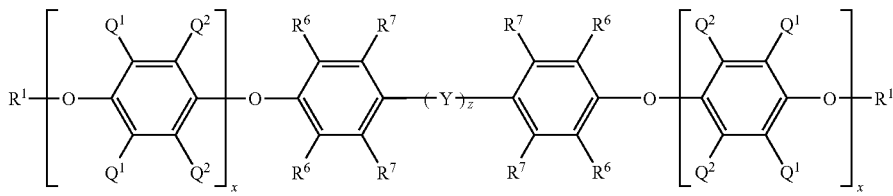

wherein z is 0 or 1; each occurrence of x is independently 1 to about 100; each occurrence of $Q^1$ is independently halogen, unsubstituted or substituted $C_1$-$C_{12}$ hydrocarbyl with the proviso that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms; each occurrence of $Q^2$ and $R^6$ and $R^7$ is independently hydrogen, halogen, unsubstituted or substituted $C_1$-$C_{12}$ hydrocarbyl with the proviso that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms; each occurrence of $R^1$ is independently hydrogen or

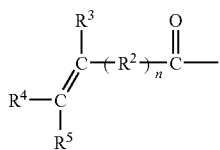

wherein n is 0 or 1; $R^2$ is $C_1$-$C_{12}$ hydrocarbylene; $R^2$ and $R^3$ and $R^4$ are each independently hydrogen or $C_1$-$C_{18}$ hydrocarbyl; and Y has a structure selected from

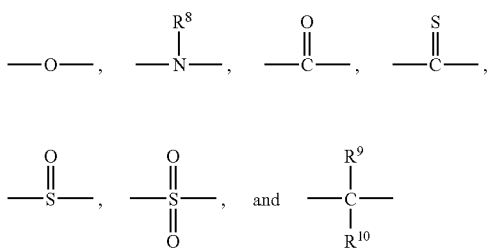

wherein each occurrence of $R^8$, $R^9$, and $R^{10}$ is independently selected from hydrogen and $C_1$-$C_{12}$ hydrocarbyl.

13. The method of claim 1, wherein the first poly(arylene ether) is a bifunctional poly(arylene ether) having the structure wherein each occurrence of x is independently 1 to about 50.

14. The method of claim 1, wherein the first solvent is dichloromethane.

15. The method of claim 1, wherein the second solvent has a Hildebrand solubility parameter of about 17 to about 21 megapascal$^{1/2}$.

16. The method of claim 1, wherein the second solvent has a Hildebrand solubility parameter of about 18 to about 20 megapascal$^{1/2}$.

17. The method of claim 1, wherein the second solvent is an aromatic hydrocarbon solvent selected from the group consisting of benzene, toluene, ethylbenzene, xylenes, anisole, and mixtures thereof.

18. The method of claim 1, wherein the second solvent is toluene.

19. The method of claim 1, wherein the second solvent is a halogenated alkane solvent selected from the group consisting of trichloromethane, dichloroethanes, trichloroethanes, tetrachloroethanes, pentachloroethanes, hexachloroethanes, tribromomethane, dibromoethanes, and mixtures thereof.

20. The method of claim 1, wherein the second solvent is chloroform.

21. The method of claim 1, wherein said forming a mixture comprises dissolving at least 80 weight percent of the first poly(arylene ether) in the mixture.

22. The method of claim 1, wherein said forming a mixture comprises adjusting the mixture to a temperature of about 10° C. to a temperature at which the mixture has a vapor pressure of about 100 kilopascals.

23. The method of claim 1, wherein the mixture comprises the first poly(arylene ether) and the second solvent in a weight ratio of about 0.2:1 to about 1:1.

24. The method of claim 1, wherein the mixture comprises the second solvent and the first solvent in a weight ratio of about 1:50 to about 1:1.

25. A method of fractionating a poly(arylene ether), comprising:

forming a mixture comprising a first poly(arylene ether), a first solvent, and a second solvent; wherein the first poly(arylene ether) has an intrinsic viscosity of about 0.1 to about 0.3 deciliter per gram in chloroform at 25° C.; wherein the first solvent is dichloromethane; wherein the second solvent is selected from the group consisting of toluene, chloroform, and mixtures thereof; and

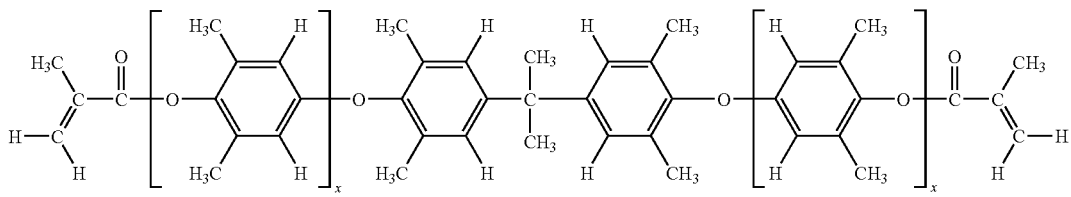

wherein at least 90 weight percent of the first poly(arylene ether) is initially dissolved in the mixture;

separating a soluble fraction and an insoluble fraction from the mixture; and isolating a second poly(arylene ether) from the soluble fraction; wherein the ratio of the intrinsic viscosity of the second poly(arylene ether) to the intrinsic viscosity of the first poly(arylene ether) is about 0.5 to about 0.9.

26. The method of claim 25, wherein the first poly(arylene ether) is a bifunctional poly(arylene ether) having the structure

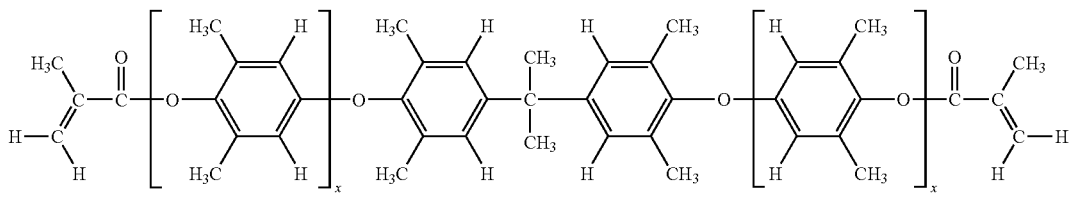

wherein each occurrence of x is independently 1 to about 50.

27. A method of fractionating a poly(arylene ether), comprising:

forming a mixture comprising a first poly(arylene ether), a first solvent, and a second solvent; wherein the first poly(arylene ether) has an intrinsic viscosity of about 0.1 to about 0.3 deciliter per gram in chloroform at 25° C.; wherein the first solvent is dichloromethane; wherein the second solvent is selected from the group consisting of toluene and chloroform; wherein the first poly(arylene ether) and the second solvent are present in a weight ratio of about 0.5:1 to about 1:1; and wherein the second solvent and the first solvent are present in a weight ratio of about 1:20 to about 1:2;

separating a soluble fraction and an insoluble fraction from the mixture; and isolating a second poly(arylene ether) from the soluble fraction; wherein the ratio of the intrinsic viscosity of the second poly(arylene ether) to the intrinsic viscosity of the first poly(arylene ether) is about 0.5 to about 0.8.

28. The method of claim 27, wherein the first poly(arylene ether) is a bifunctional poly(arylene ether) having the structure

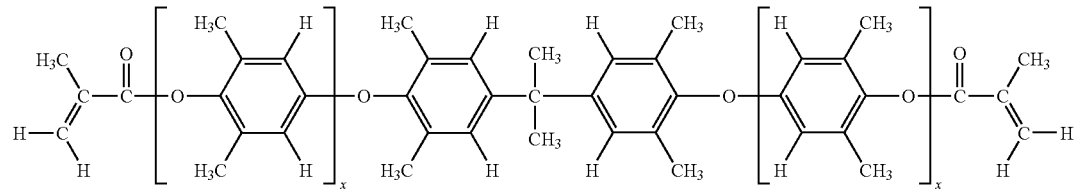

wherein each occurrence of x is independently 1 to about 50.

* * * * *